United States Patent [19]

Jörnhagen

[11] Patent Number: 4,696,480
[45] Date of Patent: Sep. 29, 1987

[54] DEVICE FOR REMOVING DIRT FROM A SURFACE, ESPECIALLY A BRUSH SEALING DEVICE

[75] Inventor: Lennart Jörnhagen, Värnamo, Sweden

[73] Assignee: Forsheda AB, Forsheda, Sweden

[21] Appl. No.: 922,970

[22] Filed: Oct. 24, 1986

[30] Foreign Application Priority Data

Oct. 24, 1985 [SE] Sweden .................. 8505013
Dec. 18, 1985 [SE] Sweden .................. 8506002

[51] Int. Cl.$^4$ .......................... F16J 15/447
[52] U.S. Cl. .......................... 277/53; 277/153; 277/24
[58] Field of Search .................. 277/53–57, 277/152, 153, 237, 24

[56] References Cited

U.S. PATENT DOCUMENTS

| | | |
|---|---|---|
| 1,389,624 | 9/1921 | Carroll . |
| 2,878,048 | 3/1959 | Peterson .................. 277/53 X |
| 3,103,935 | 9/1963 | Woodrow .................. 132/84 |
| 3,129,449 | 4/1964 | Cyzer .................. 15/28 |
| 3,214,775 | 11/1965 | Murov et al. .................. 15/22 |
| 3,903,906 | 9/1975 | Collis .................. 132/84 R |
| 3,917,150 | 11/1975 | Ferguson et al. .................. 277/53 X |
| 4,202,554 | 5/1980 | Snell .................. 277/53 |
| 4,463,470 | 8/1984 | Willis .................. 15/167 R |

FOREIGN PATENT DOCUMENTS 2344666 3/1974 Fed. Rep. of Germany ........ 277/53
2021210 11/1979 United Kingdom ............... 277/53

Primary Examiner—Robert S. Ward
Attorney, Agent, or Firm—Pollock, Vande Sande & Priddy

[57] ABSTRACT

A device for removing dirt and contaminants from a surface comprises a number of fibres (24) fixedly supported at one end and extending towards and engaging at a contact surface (28) the surface (2) from which the dirt and contaminants shall be removed. The fibres (24) have conveyor surfaces (32) extending obliquely in relation to the direction of relative movement between the fibres and said surface (2), said conveyor surfaces being adapted to move the dirt and contaminants away from said surface in direction transversely to the direction to said relative movement between the fibres (24) and said surface (2).

7 Claims, 9 Drawing Figures

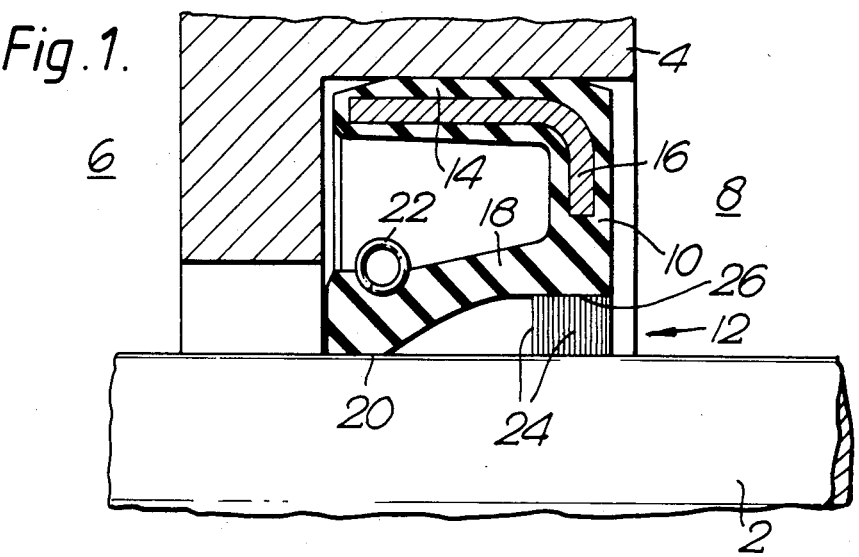
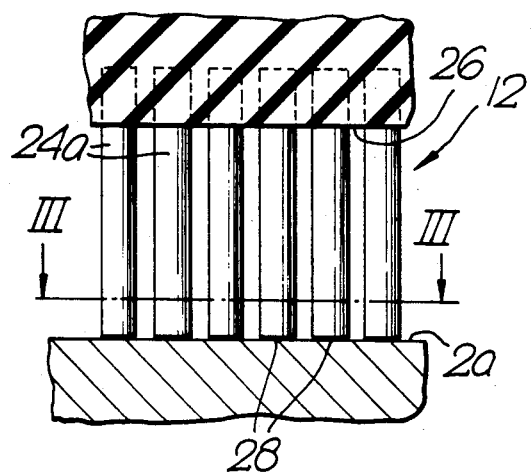
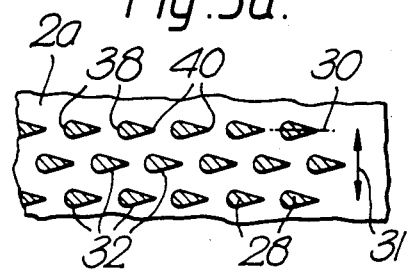
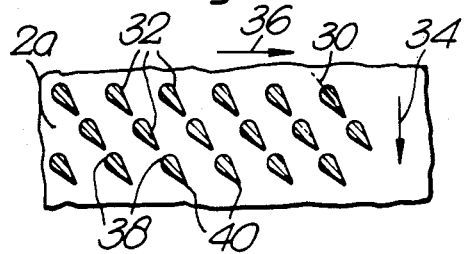
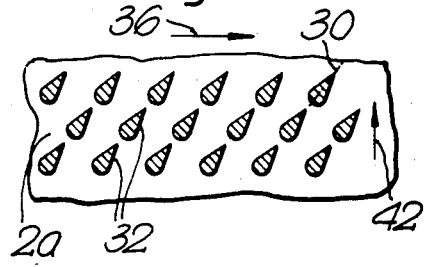

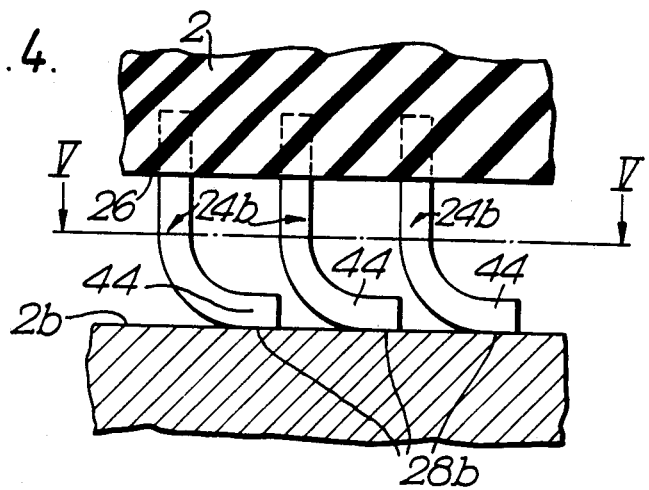
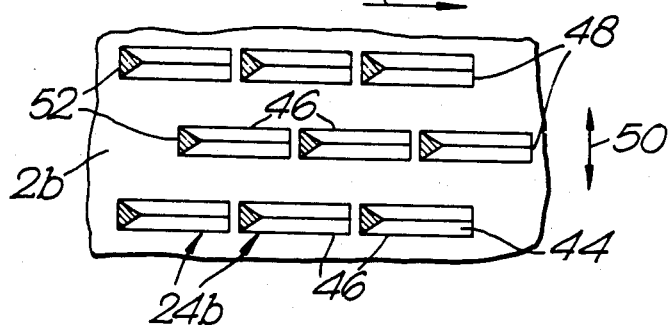
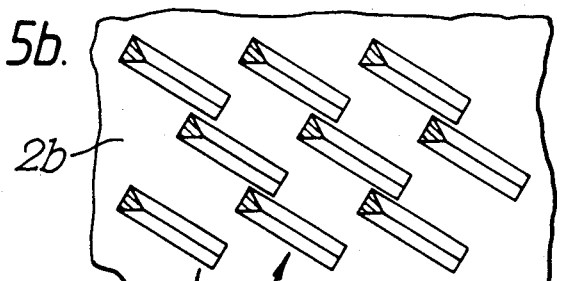
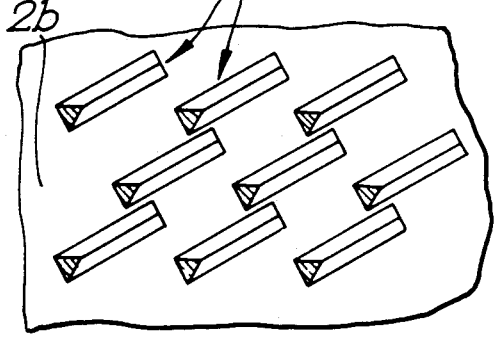

DEVICE FOR REMOVING DIRT FROM A SURFACE, ESPECIALLY A BRUSH SEALING DEVICE

BACKGROUND OF THE INVENTION

A prior art device of this kind comprises a number of fibers which are fixedly supported at one end and extend towards and engage by means of contact surfaces the surface from which the dirt and contaminants shall be removed, the fibers being adapted to remove the dirt and contaminants while being translationally moved in relation to said surface. A device of this kind can be utilized as a so called brush seal, the device being thereby positioned in a space between two surfaces being moved in relation to each other for preventing dirt and contaminants to enter the space and removing dirt having already entered this space. A brush seal of this kind is used for example, as an integrated additional seal in a shaft seal device, the primary seal being constituted by a radial or axial sealing ring of elastomeric material, for example rubber, having a sealing lip sliding along a counter surface and sealing against for example oil or grease. By preventing dirt and contaminants from reaching the sealing lip the additional seal provides for an improved total sealing effect of the sealing device as well as an extended life of the primary seal.

In a sealing device of the brush seal type it is usually desirable that the device displaces the dirt and contaminants in a direction transversely of the direction of the relative movement between the fibers and the surface from which the dirt and contaminants are to be be removed. In sealing devices of the kind described, wherein the brush seal constitutes an additional seal it is of course desirable to displace the dirt and the contaminants laterally away from the primary seal. However, such controlled displacement of the dirt and contaminants is not possible in prior art sealing devices of the kind comprising fibers engaging and being moved in relation to the surface from which the dirt is to be removed.

SUMMARY OF THE INVENTION

The object of the present invention is to povide a device of the type mentioned above having the capacity of displacing the dirt away from the device laterally in respect of the relative movement between the fibers and the surface from which the dirt shall be removed. In order to comply with this object, there is according to the invention provided a device for removing dirt and contaminants from a surface comprising fibers having conveyor surfaces extending obliquely to the direction of relative movement between the fibers and the surface from which the dirt and contaminants are to be removed, said conveyor surfaces being adapted to displace the dirt and contaminants away from the surface in a direction transversely of the direction of the relative movement.

In a prefered embodiment of the device according to the invention, each fibers has at least two conveyor surfaces adapted to be in operation at each one direction of opposite directions of relative movement between the fibers and the surface. In this embodiment, it is preferred that the fibres are adapted to be displaced between two different positions on reversal of the direction of relative movement between the fiber and the surface so that different conveyor surfaces are in operation in different positions of the fibers.

In the prefered embodiment the fibers displace the dirt and contaminants away from the surface in the same conveyance direction irrespective of the relative movement between the fibers and the surface taking place in one or the other of the two opposite directions. In an axial sealing device, wherein the device according to the present invention constitutes an additional seal, this provides the effect that the additional seal displaces the dirt away from the primary seal irrespective of the rotational direction of the shaft in relation to the ambient construction.

In order to provide that the fibers take different positions in which different conveyor surfaces are in operation the fibers can be designed so that the contact surfaces of the fibers engaging the surface from which the dirt or contaminants shall be removed are of longitudinal shape, the two conveyor surfaces of the fibers being constituted by the sides of the portions of the fibers adjacent the contact surfaces. Furthermore, the fibers are designed so that they present at one end of the contact surface a greater resistance against displacement by the surface when the surface is moved in relation to the fibers that at the other end of the contact surface. The fibers are fixedly supported in such a way that they strive to take a position in which the longitudinal axis of the contact surfaces of the fibers extends substantially perpendicular to the direction of relative movement between the fibers and the surface from which the dirt is to be removed. When the fibers are designed in this way, the portions of the fibres adjacent the contact surface will take the two different positions in which different conveyor surfaces are in operation dependent on the direction of the relative movement between the fibers and the surface.

The invention is described in the following with reference to the accompanying drawings.

BRIEF DESCRIPTION OF THE FIGURES

FIG. 1 is an axial section of a portion of a shaft sealing device in which the device according to the present invention is included as an additional seal.

FIG. 2 shows an embodiment of the device according to the invention on an enlarged scale.

FIGS. 3a, 3b and 3c are cross-sections take along line III—III in FIG. 2 and show the device according to the present invention in different operational positions.

FIG. 4 is a view corresponding to FIG. 2 showing another embodiment of the device according to the present invention.

FIGS. 5a, 5b and 5c are cross-sections taken along line V—V in FIG. 4 and show the device according to the invention in different operational conditions.

DESCRIPTION OF THE PREFERRED EMBODIMENT

In FIG. 1 there is shown a rotatable shaft 2 extending through an opening in a wall 4. In order to seal the spaces 6 and 8 at opposite sides of the wall 4, there is in the clearance space between the outer surface of the shaft 2 and surface defining the opening in the wall 4 provided an axial sealing device of the radial type. The axial sealing device comprises a primary seal in the form of radial sealing ring 5 and a brush seal 12 which constitutes a device according to the present invention. The radial sealing ring 5 consists of rubber and has a fastening portion 14 by means of which the radial sealing ring 10 is connected with the wall 4. The fastening portion 14 is provided with a reinforcing ring 16 consisting of metal. The radial sealing ring 10 has a sealing portion 18 comprising a sealing lip 20 which is radially forced against the cylindrical outer surface of the shaft 2 by means of a spring 22.

The device according to the present invention constituted by a brush seal 12 has the object of preventing dirt and contaminants present in the space 8 from reaching the sealing lip 20. Thereby, there is provided an improved sealing action of the sealing device and there is also provided a longer life of the sealing ring 10 because of the fact that grinding particles are prevented from wearing the sealing lip 20. In accordance with the invention, the brush seal 12 is designed so that the dirt particles are displaced in a direction away from the sealing device irrespectively of the rotational direction of the shaft 2. This is provided by a special design of the fibers 24 of the brush seal 12 according to the present invention. The design of the fibers of two different embodiments of the device appears from FIGS. 2 and 3, and FIGS. 4 and 5, respectively. One end of the fibers is fixedly supported by a surface 26 of the sealing ring 10. At their opposite end from the surface 26, the fibers 24 engage the cylindrical outer surface of the shaft 2. Thus, when the shaft is rotated the fibers are in sliding contact with the cylindrical outer surface of the shaft by means of their contact surfaces in order to remove the dirt from the surface of the shaft.

According to FIG. 2 the fibers 24a are fixedly supported by the sealing ring 10 at the surface 26 at their upper ends while the fibers extend from the surface 26 substantially perpendicular towards the surface 2a, which represents the outer surface of the shaft 2. The fibers 24a engage the surface 2a at their free end surfaces by means of contact surfaces 28.

FIG. 3a shows the sectional shape of the fibers 24a, the sectional shape corresponding to the shape of the contact surfaces 28. In the embodiment according to the invention shown in FIGS. 2 and 3, the fibers have substantially drop shaped cross section and contact surface 28. The fibers 24a are fastened to and supported by the surface 26 so that the longitudinal and symmetrical axis 30 of the fibers is in the relaxed condition thereof extending substantially perpendicular to the intended direction 31 of the relative movement between the surface 2a and the fibers 24a. Adjacent the contact surface 24 the fibers form oblique conveyor surfaces 32 having the object of removing dirt and contaminants from the surface 2a when the surface 2a and the fibers are moved in relation to each other.

When the surface 2a is moving in the direction shown by the arrow 34 in FIG. 3b, the fibers will, at their contact surfaces 28 take the position shown in FIG. 3b, in which the conveyor surface 32 which is contacted by dirt particles on the surface 2a, takes an angular position providing that the dirt particles on the surface 2a will be displaced away from the surface 2a in the direction shown by the arrow 36, i.e. in a direction away from the radial sealing ring 10. The shown position of the contact surface 28 is provided by the fact that the fibers 2a present a greater resistance against displacement at the end 38 of the contact surface 28 than at the end 40 thereof. This difference is of course due to the fact that the section of the fibers is wider at the end 38 than at the end 40.

As appears from FIG. 3c, the fibers 24a assume a position rotated from the position according to FIG. 3b in the counter-clockwise direction when the surface 2a is moved in the direction shown by the arrow 42. In this position, the conveyor surface 32 at the opposite side of the fibers is in operation for displacing the dirt from the surface 2a. Because of the changing of the rotational position of the fibers there is obtained the same direction of movement of the dirt, i.e., away from the radial sealing ring 10, in spite of the fact that the direction of movement of the surface 2a has been reversed.

In the embodiment according to the present invention shown in FIGS. 5a, 5b and 5c, the fibers 24b have greater length than the distance between the surface 26 and the surface 2a. Therefore, the fibers 24b will assume a position in which the fibers have at their free ends a deflected portion 44. Thus, the outer surface of the deflected portion of the fibers will constitute the surface 28b of the fiber contacting the surface 2b. Thereby the sides of the deflected portion 44 will constitute the conveyor surfaces 46 of the fiber. It is realized that the deflected portion will present less resistance against displacement at its free end 48 than at the opposite end 52 of the deflected portion 44 when the surface 2a is moved in the direction according to the double arrow 50. Thereby, the fibers 24b will act in the same way as the fibers 24a when the surface 24b is moved in opposite directions in order to transport dirt from the surface 2b in the direction shown by the arrow 54 irrespective of the rotational direction of the surface 2b. In the embodiment according to FIGS. 5a, 5b and 5c the cross section of the fibers is triangular providing that the deflected portion 44 forms a flat contact surface 28b against the surface 2b. It is, of course, possible to design the cross section of the fibers in the desired way to provide the desired function. For example, it is possible to provide the contact surface 28b with grooves or the like for constituting a number of scraping edges at the contact surfaces.

The invention can be modified within the scope of the following claims. Thus, the invention can be utilized in many other applications other than in sealing devices. It is also possible to provide further modified embodiments of the fibers while maintaining the conveyor effect constituting the basic concept of the invention.

I claim:

1. A device for removing dirt and contaminants from a surface comprising:
    a plurality of fibers firmly supported at one end, said fibers extending towards and engaging by means of a contact surface, the surface from which the dirt and contaminants are to be removed, said fibers being adapted to remove the dirt and contaminants while being transitionally moved in relation to this surface, said fibers forming conveyor surfaces extending obliquely with respect to the relative movement between said fibers and the surface, and adapted to remove the dirt and contaminants away from the surface in a direction extending transversely to the direction of the relative movement between said fibers and the surface from which dirt and contaminants are to be removed.

2. A device as claimed in claim 1 wherein each of said fibers has at least two conveyor surfaces which are adapted to be in operation during opposite directions of the relative movement between said fibers and the surface.

3. A device as claimed in claim 2 wherein said fibers are adapted to be displaced between two different positions in which different conveyor surfaces are in operation when the direction of the relative movement between said fibers and the surface is reversed.

4. A device as claimed in claim 1, wherein said contact surface of said fibers is of longitudinal shape, said two conveyor surfaces are provided at the sides of said fibers adjacent said contact surface, said fibers being supported for assuming a position in which the axis of said contact surface extends substantially perpendicular to the direction to the relative movement between said fibers and the surface, and said fibers at one end of said contact surface present a greater resistance against displacement than at the other end thereof, so that the portions of the fibers adjacent said contact surface assume two different positions dependent on the direction of the relative movement between said fibers and the surface.

5. A device as claimed in claim 4, wherein said fibers extending substantially perpendicular to said surface and forming said contact surface at said one end, have a cross-section tapering from said one end toward the other end of said contact surface.

6. A device as claimed in claim 5 wherein said fibers are of wedge or drop-shaped cross-section.

7. A device as claimed in claim 4 wherein said fibers are deflected and form said contact surface at the envelope surface thereof, said fibers are fixedly supported at the end, presenting the greatest resistance against the displacement of the contact surface, and said other end is positioned at the free end of said fibers.

* * * * *